United States Patent [19]
Kempton et al.

[11] 3,789,876
[45] Feb. 5, 1974

[54] SOLENOID VALVE WITH ELECTRONIC POSITION INDICATOR

[75] Inventors: Calvin E. Kempton, Laguna Hills; Robert H. Reinicke, Mission Viejo, both of Calif.

[73] Assignee: Parker Hannifin Corporation, Cleveland, Ohio

[22] Filed: Apr. 6, 1973

[21] Appl. No.: 348,747

[52] U.S. Cl................. 137/554, 251/129, 340/238, 340/282
[51] Int. Cl............................................ F16k 37/00
[58] Field of Search..... 137/554; 340/238, 282, 285

[56] References Cited
UNITED STATES PATENTS

| | | | |
|---|---|---|---|
| 3,411,076 | 11/1968 | Federici et al................. | 340/382 X |
| 3,456,132 | 7/1969 | Dechelotte..................... | 340/382 X |
| 3,721,821 | 3/1973 | Blanyer.......................... | 340/285 X |

FOREIGN PATENTS OR APPLICATIONS

| | | | |
|---|---|---|---|
| 649,227 | 9/1962 | Canada.............................. | 340/282 |
| 663,120 | 5/1963 | Canada.............................. | 340/282 |
| 754,917 | 8/1956 | Great Britain...................... | 137/554 |

*Primary Examiner*—Alan Cohan
*Assistant Examiner*—Gerald A. Michalsky
*Attorney, Agent, or Firm*—Donnelly, Maky, Renner & Otto

[57] ABSTRACT

A solenoid valve with an electronic position indicator in which the armature of the solenoid coil means is itself the movable valve member or is operatively coupled with the movable valve member characterized in that the solenoid coil means is hooked up as an inductance bridge to an AC power source, the armature being effective to vary the relative inductances of the legs of the bridge according to the position of the armature with respect to said solenoid coil means, the voltage drops at the juncture of the legs being compared with in-phase reference voltages and resolved by a phase detector having an output which indicates the position of the armature and thus indicates the position of the valve. The invention herein is further characterized in that the armature is actuated by DC energization of the solenoid coil means and in that the position indicator has condensor means to prevent the DC voltage from entering the position indicating circuitry.

16 Claims, 4 Drawing Figures

PATENTED FEB 5 1974   3,789,876

SOLENOID VALVE WITH ELECTRONIC POSITION INDICATOR

BACKGROUND OF THE INVENTION

It is known to provide an extension on the valve member or armature of a solenoid operated valve which extends externally of the valve or solenoid housing thus to provide a visual signal of the valve position, and in cases where the valve member is the armature, it is necessary to provide a sliding seal of the extension to prevent loss of fluid. Aside from providing such direct visual signal of the valve position it has been proposed to have the valve member or armature arranged to operate switch contacts to denote different valve positions, or to couple the valve member or armature to a linear transducer which converts linear position information of the armature or valve member into a DC output voltage which is proportional to the axial displacement of a probe operatively connected to the armature or valve member.

SUMMARY OF THE INVENTION

In contradistinction to the foregoing the present invention has for its principal object the provision of a valve position indicator for a solenoid operated valve in which the valve member position is electronically indicated without any mechanical connection with the solenoid armature or valve member and without any switch contacts.

It is another object of this invention to provide a position indicator for a solenoid operated valve in which the valve member or armature is latched by permanent magnet means in its operating positions and in which the armature actuating means is only momentarily energized to shift the armature or valve member from one operating position to another in which it is retained therein by the permanent magnet means, the electronic position indicator being responsive to the position of the armature or valve member without any mechanical connection therewith or without any switch contacts.

It is yet another object of this invention to provide a solenoid valve with a position indicator which is electronically operative to denote not only the two operating positions of a solenoid operated three-position four way valve but additionally the neutral position of such four way valve.

Other objects and advantages will appear from the ensuing description.

DETAILED DESCRIPTION OF THE INVENTION

Figure 1:
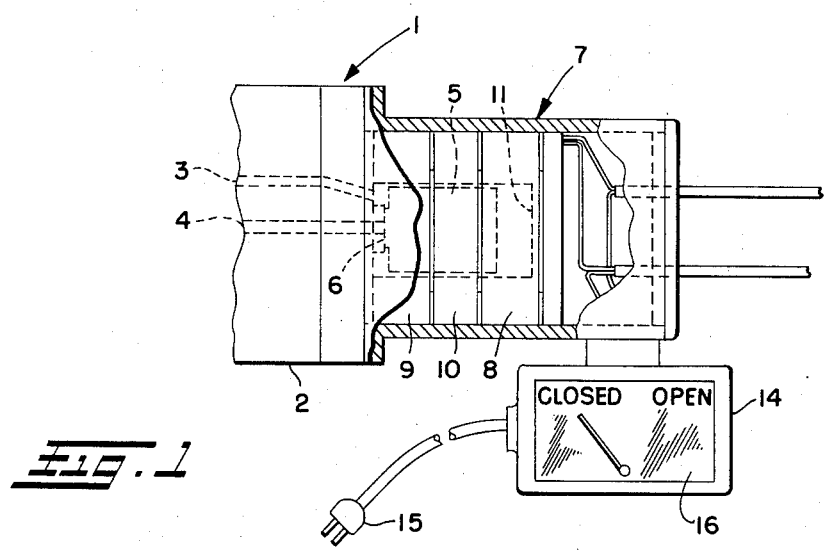
FIG. 1 is a partial cross-section view of a two-position solenoid operated on-off valve having permanent magnet latching and having an electronic position indicator associated therewith to denote the closed and open positions of the valve.

Referring to FIG. 1 the solenoid operated valve 1 therein comprises a two-position, on-off valve having a housing 2 provided with fluid passages 3 and 4 between which communication is opened and closed by movement of the valve member 5 into and out of engagement with the valve seat 6. In the illustrated example, the valve member 5 constitutes the armature which is reciprocable in a solenoid assembly 7 comprising the coils 8 and 9 and the permanent magnet 10 therebetween, said permanent magnet 10 being effective to latch the valve member 5 in the closed or open positions when the coils 8 and 9 are energized to draw the armature 5 to the left or right into engagement with the seat 6 or stop surface 11, said armature being retained or latched in either of said positions upon deenergization of the solenoid coils 8 and 9. In the particular example shown, the solenoid coils 8 and 9 are energized with DC through a polarity reversing switch 12 to pull the armature 5 in one direction or the other. Associated with the valve 1 is an electronic position indicator 14 which is adapted to be connected to an AC power source 15 and which has indicating means 16 to indicate whether the armature 5 is in a position closing or opening the valve 1.

Figure 2:
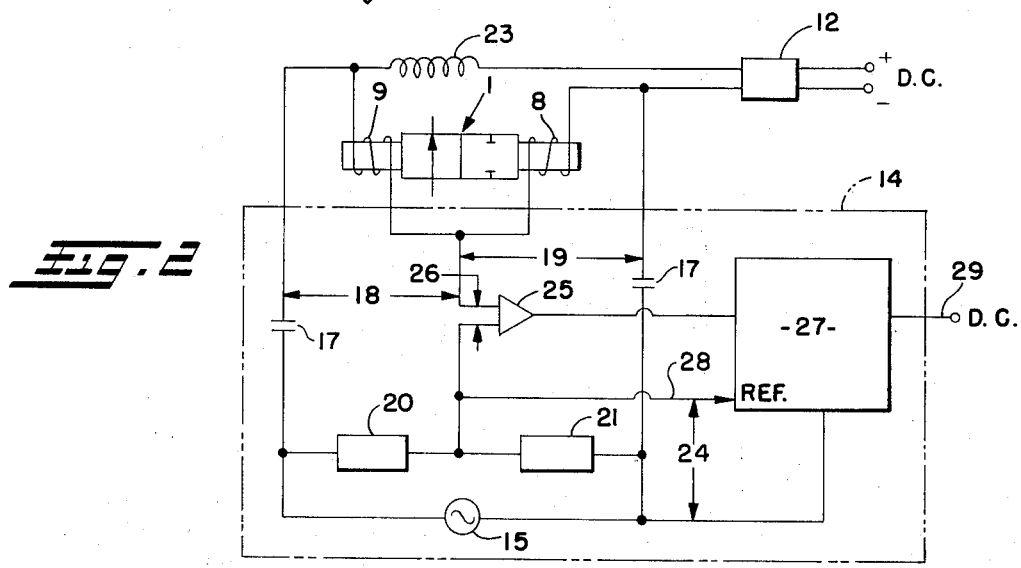
FIG. 2 is a schematic wiring diagram of the embodiment of the invention shown in FIG. 1, the solenoid operated valve being shown schematically without the latching means which latches the valve member or armature in a position closing or opening the valve.

In FIG. 2 the valve 1 is shown schematically and the coils 8 and 9 are shown as being connected together in series for actuation of the armature 5 in opposite directions responsive to reversal of the polarity of the actuating DC source by switch 12. The coils 8 and 9 are connected together and to the AC power source 15 in the manner of an inductance bridge with capacitors 17 to isolate the DC voltage from the position sensing circuitry. Inductor 23 is provided to prevent the AC voltage from being shorted out by the DC source. The armature 5 is so arranged that the inductance of one leg 18 of the inductance bridge is greater than the inductance of the other leg 19 when the armature is in one position and such inductances in the legs 18 and 19 are respectively decreased and increased when the armature 5 is in the other position. The AC voltage source 15 and impedances 20 and 21, when connected together as shown, provide a reference voltage to the differential amplifier 25 and to the phase detector 27. These impedances 20 and 21 may comprise resistors, capacitors, inductors or combinations of such components and are selected so that the difference voltage 26 which is applied to the differential amplifier 25 is equal but 180° out of phase when the armature 5 is in either of its two positions. As known, when the armature 5 is disposed in one leg 18 or 19 of the solenoid coil 9 or 8, the inductance of said leg 18 or 19 is greater than the inductance of the other leg 19 or 18 and, hence, the voltage drop across that leg 18 or 19 will be greater than across the other leg 19 or 18 and this will be reflected by voltage differences across 26 at the input of the differential amplifier 25. The differential amplifier 25 will in known manner amplify the signal voltage across 26 to a value suitable for the synchronous phase detector 27 which compares this signal with the source voltage through line 28. The output 29 from the phase detector will be DC of value depending on the position of the armature 5. Such output 29 may be positive or negative depending on the position of the armature 5 or it may be zero or positive, likewise depending on the position of the armature 5. The unidirectional output voltage 29 of the phase detector 27 may be coupled to a suitable indicating meter 16 which in FIG. 1 will indicate the closed position of the valve 1 when the left leg 18 of the solenoid coil 9 has a higher inductance as compared to when the armature 5 is in its righthand position. When the armature 5 is in its righthand position, the righthand leg 19 of the coil 8 will have a greater inductance as compared to when the armature 5 is in its lefthand position and, hence, the meter 16 will indicate that the valve 1 is open.

In lieu of using a permanent magnet 10 to effect latching as indicated, it is contemplated to utilize the electronic position indicator 14 in connection with a solenoid operated valve having mechanical latching means to retain the valve member or armature 5 in either of two positions. Moreover, although the two-position valve 1 shown herein is an on-off valve the principles of the invention may be applied to a two-position, three way valve.

Figures 3, 4:
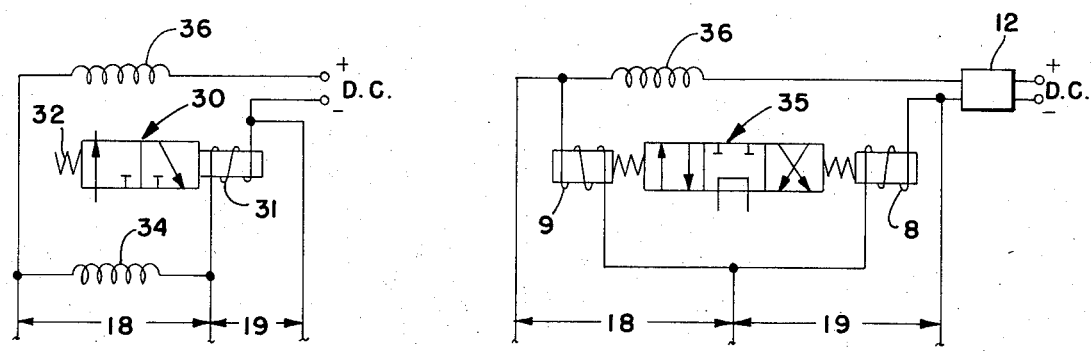
FIG. 3 is a schematic diagram of a two-position, three way valve which has a solenoid actuated position and a spring return position.
FIG. 4 is a view similar to FIG. 3 except showing a conventional three-position, four way valve having an intermediate spring centered neutral position and two operating positions controlled by appropriate energization of solenoid coil means and associated armature which is operatively engaged with the movable valve member of said four way valve.

In FIG. 3 is shown a two-position, three way valve 30 in which the valve member is actuated to one position by energization of coil 31 and to the other position by spring 32 upon deenergization of coil 31. In this case, a matching coil 34 is wired in series with coil 31 to form the inductance bridge legs 18 and 19 for connection with the position indicator 14 as shown in FIG. 2. Inductor 36 is provided to prevent the AC voltage from being shorted out by the DC source.

In some instances, the electronic position indicator 14 may be employed in connection with a three-position, four way valve 35 as shown in FIG. 4 wherein the valve member is spring centered in neutral position at which the inductances of the inductance bridge legs 18 and 19 are equal whereby the voltage drops across 18 and 19 remain the same and, hence, the output voltage 29 of the phase detector 27 will indicate the neutral position at which there is no difference between the inductances of the legs 18 and 19. When the coil 8-9 is energized to result in a higher inductance in the leg 18 than in the other leg 19 such change in voltage at the differential amplifier 25 will be reflected in the DC output 29 of the phase detector 27 to indicate one of the two operating positions of the four way valve 35 and if the valve has no latching means, the DC actuation power may be kpet on so long as it is desired to maintain the valve 35 in that position. On the other hand, when the solenoid coil 8-9 is energized to increase the inductance of the righthand leg 19 of the inductance bridge in relation to the inductance of the lefthand leg 18, this will be reflected in a different DC output 29 of the phase detector 27 with corresponding indication on the meter 16. In the illustrative example, shown in FIG. 4 the valve 35 is shown as having a neutral position when the solenoid coil 8-9 is deenergized, and at that position, the inductances of the legs 18 and 19 in the bridge are equal and hence there will not be any change in the voltage across 26 whereby the output voltage from the differential amplifier 25 and from the phase detector 27 will be zero and this will be reflected on the meter 16 by an indication of the intermediate neutral position in which, for example, the pump output will be bypassed to the tank and the motor ports of a double acting fluid motor will be blocked from communicating with the pressure inlet and return ports. It is to be understood that other forms of center envelopes as well known in the art may be substituted for that shown in FIG. 4. In FIG. 4, it is intended that the DC actuation power be maintained in "on" position so long as it is desired to maintain the valve 35 in either one of its two operating positions but the electronic position indicator 14 will still function in the manner indicated in that the DC actuating voltage will not communicate to the legs containing the impedances 20 and 21 in connection with the reference voltage to yet give an output voltage from the phase detector 27 which reflects the operating position of the armature or valve member at that time. It is to be understood that suitable latch means (not shown) may be provided to retain the valve 35 in either or both of its operating positions when the solenoid 8-9 energization is discontinued and, when the solenoid 8-9 energization is reestablished the armature will be drawn to the other position to overcome the latch mechanism whether it be mechanical or magnetic as indicated in connection with FIG. 1.

In the examples herein given the legs 18 and 19 of the inductance bridge are in series with the DC actuation arranged so that a reversal of polarity through switch 12 results in movement of the armature 5 in one direction or the other. Obviously, the coils 8-9 may be separately energizable with separate armatures 5 at opposite sides of the valve. In that case, when the armature 5 remains in the energized coil 8 or 9 the inductance of that coil is increased with reference to the inductance of the other coil and, vice versa, the voltage drops across the inductances 8 and 9 is changed so as to be reflected in a changing voltage with reference to the in phase reference voltage 24. Upon amplification of the difference voltage by amplifier 25, the synchronous phase detector 27 will detect which coil 8 or 9 has the greater inductance so that the position of the armature 5 is known and indicated by the meter 16.

The embodiments of the invention in which an exclusive property or privilege is claimed are defined as follows:

1. A solenoid operated valve having coil means and an armature movable within said coil means, said armature being operatively associated with a movable valve member in said valve to shift the valve from one position to another; and an AC powered electronic valve position indicator connected to said coil means so that the latter constitutes an inductance bridge of which the leg having the armature therein has an increased inductance as compared with the inductance of the other leg whereby to provide different voltage drops across said legs at the juncture thereof; means providing a reference voltage of predetermined magnitude and phase; and phase detector means determining the position of the valve according to the relative inductances of said legs.

2. The solenoid valve of claim 1 wherein said coil means is energized from a DC source and wherein said AC source for said position indicator is isolated from said DC source by capacitor means so that the reference voltage is not influenced by the presence of said DC voltage.

3. The solenoid valve of claim 2 wherein said DC source is isolated from said AC source by inductor means.

4. The solenoid valve of claim 1 wherein a differential amplifier amplifies the difference voltages and conducts them to a phase detector which has an output voltage dependent upon the position of the armature with respect to the legs of said inductance bridge.

5. The solenoid valve of claim 1 wherein permanent magnet means retains said armature in the actuated position upon deenergization of said coil means.

6. The solenoid valve of claim 1 wherein said valve member and armature are shifted from said another operating position to said one position by spring means acting thereon upon deenergization of said coil means.

7. The solenoid valve of claim 6 wherein said other leg of said inductance bridge has a constant inductance and is not influenced by said armature being disposed in or out of the coil means constituting said one leg.

8. The solenoid valve of claim 1 wherein said means providing a reference voltage comprises an impedance bridge in parallel with said inductance bridge.

9. A solenoid valve having a movable valve member therein which is movable selectively to either of two positions to control flow of fluid through said valve; a solenoid armature operatively connected with said valve member and movable in opposite directions in a solenoid coil by reversed polarity DC actuation of the latter; said coil being connected to an AC power source to form an inductance bridge between adjacent sections of said coil; said armature in its respective positions producing a higher inductance in one leg as compared with the inductance in the other leg and vice versa whereby the voltage drops across said legs periodically fluctuates in accordance with the different inductances of said legs, said fluctuating voltage at the junction of said legs being conducted to a phase detector powered by an AC power source which detects which leg has the higher inductance and produces an output voltage to denote the position of the armature which produces such higher inductance 10. The solenoid valve of claim 9 wherein said valve has permanent magnet latch means to retain the armature and, hence the valve member, in either one of its selected positions when said coil is deenergized, said coil when subsequently energized overcoming the holding effect of said permanent magnet to effect movement of the armature from one latched position to the other latched position at which other latched position the armature remains when the coil is deenergized.

11. The solenoid valve of claim 9 wherein said valve has an intermediate third position at which the inductances in said legs are equal and in which condition the output voltage of the phase detector is such as to indicate that said armature and valve are in said neutral position.

12. A solenoid operated valve comprising coil means connected to an AC source in the manner of an inductance bridge; an armature operatively associated with a movable valve member in said valve and moved from one position to another in relation to at least one of the legs of said inductance bridge upon DC energization of said coil means to change the inductance of said one leg with respect to the inductance of the other leg; an impedance bridge connected to said AC source to provide a reference voltage at the junction of its legs; and a phase detector means comparing the voltage drops at the junction of the legs of said inductance bridge with said reference voltage thereby determining the position of said armature and thus of said valve member.

13. The solenoid valve of claim 12 wherein capacitor means isolates said AC source from said DC source so that the reference voltage is not influenced by the presence of said DC voltage.

14. The solenoid valve of claim 13 wherein inductor means isolates said DC source from said AC source.

15. The solenoid valve of claim 12 wherein a differential amplifier amplifies the difference voltages at the junctions of said inductance and impedance bridges and conducts them to said phase detector means which has an output voltage dependent upon the position of the armature with respect to said one leg of said inductance bridge.

16. A solenoid valve having a movable valve member therein which is movable selectively to either of two positions to control flow of fluid through said valve; a solenoid armature operatively connected with said valve member and movable in opposite directions in a solenoid coil by reversed polarity DC actuation of the latter; said coil being connected to an AC power source to form an inductance bridge between adjacent sections of said coil; said armature in its respective positions effecting a change in the inductance in one leg as compared with the inductance in the other leg and vice versa whereby the voltage drops across said legs at the junction thereof periodically fluctuates in accordance with the different inductances of said legs; an impedance bridge connected to said AC power source to provide a reference voltage at the junction of its legs; said voltage at the junction of said legs of said inductance bridge and said reference voltage being conducted to a phase detector which detects which leg of said inductance bridge has the changed inductance, and produces an output voltage to denote the position of the armature which produces the changed inductance.

* * * * *